United States Patent
Ko et al.

(10) Patent No.: US 10,279,382 B2
(45) Date of Patent: May 7, 2019

(54) DYNAMIC TWO-WAY GUIDE AND DRAINAGE CONTROL METHOD FOR LEACHATE AND LANDFILL GAS

(71) Applicant: Peking University Shenzhen Graduate School, Shenzhen (CN)

(72) Inventors: Jae Hac Ko, Shenzhen (CN); Qiyong Xu, Shenzhen (CN); Fan Yang, Shenzhen (CN)

(73) Assignee: Peking University Shenzhen Graduate School, Shenzhen (CN)

( * ) Notice: Subject to any disclaimer, the term of this patent is extended or adjusted under 35 U.S.C. 154(b) by 0 days.

(21) Appl. No.: 15/831,472

(22) Filed: Dec. 5, 2017

(65) Prior Publication Data
US 2018/0154408 A1    Jun. 7, 2018

(30) Foreign Application Priority Data
Dec. 5, 2016    (CN) .......................... 2016 1 1103988

(51) Int. Cl.
| | |
|---|---|
| B09B 1/00 | (2006.01) |
| B09B 3/00 | (2006.01) |
| B09B 5/00 | (2006.01) |
| C02F 103/06 | (2006.01) |
| E03F 5/16 | (2006.01) |
| E21B 49/08 | (2006.01) |

(52) U.S. Cl.
CPC .............. *B09B 1/006* (2013.01); *B09B 1/004* (2013.01); *B09B 3/0016* (2013.01); *B09B 3/0058* (2013.01); *B09B 5/00* (2013.01); *C02F 2103/06* (2013.01); *E03F 5/16* (2013.01); *E21B 49/087* (2013.01); *Y02W 30/32* (2015.05)

(58) Field of Classification Search
CPC combination set(s) only.
See application file for complete search history.

(56) References Cited

U.S. PATENT DOCUMENTS

| | | | |
|---|---|---|---|
| 6,283,676 B1* | 9/2001 | Hater ........................ | B09B 1/00 210/747.1 |
| 2006/0222463 A1* | 10/2006 | Subbarayan .............. | B09B 1/00 405/129.85 |
| 2006/0222464 A1* | 10/2006 | Schwalbe ................. | B09B 1/00 405/129.95 |
| 2007/0116525 A1* | 5/2007 | Hater ........................ | B09B 1/00 405/129.95 |
| 2007/0161104 A1* | 7/2007 | Diemer .................. | C12M 21/04 435/289.1 |
| 2007/0189856 A1* | 8/2007 | Schwalbe ................. | B09B 1/00 405/129.95 |
| 2011/0045580 A1* | 2/2011 | Hater ........................ | B09B 1/00 435/290.4 |
| 2011/0283821 A1* | 11/2011 | Ober .................. | G01N 33/0031 73/866.1 |
| 2011/0290721 A1* | 12/2011 | Aho ........................ | B09B 1/004 210/605 |

* cited by examiner

*Primary Examiner* — Kyle Armstrong
(74) *Attorney, Agent, or Firm* — W&K IP (57) ABSTRACT

Provided is a dynamic two-way guide and drainage control method for leachate and landfill gas. The dynamic two-way guide and drainage control method is used in a waste landfill. By implementing the present invention, the water-guiding permeability inside the waste body is improved, and the problems that the water level of the leachate is raised, the landfill gas is escaped, the collection efficiency is extremely low and the like during a waste landfilling process at present are solved.

7 Claims, 5 Drawing Sheets

FIG. 5 ically, the landfill gas collection efficiency is extremely low. Furthermore, once excessive landfill gas is piled in the landfill, the pore pressure of the landfill is increased and therefore there exists a huge potential safety hazard to the landfill. Meanwhile, the leachate in the waste landfill is collected using an existing bottom leachate converging system, so under the conditions such as the pipe is deformed, blocked or corroded once the leachate cannot be guided and discharged out in time, the water level of the leachate is raised easily, and thus the landfill gas collection efficiency is reduced. Besides, there are more rains in south and has a turbulence phenomenon of a gas recycling pipe network commonly confronted by the waste landfill that the water level of the leachate is relatively high in essence, and after the rainwater is infiltrated from a surface of the landfilled waste, the water level of the leachate inside the waste is raised and the gas extraction well is blocked; and therefore, the discharging and the recycling rate of the landfill gas are directly affected.

DYNAMIC TWO-WAY GUIDE AND DRAINAGE CONTROL METHOD FOR LEACHATE AND LANDFILL GAS

CROSS-REFERENCE TO RELATED APPLICATIONS

This application claims priority to Chinese Patent Application No. 201611103988.X with a filing date of Dec. 5, 2016. The content of the aforementioned applications, including any intervening amendments thereto, are incorporated herein by reference.

TECHNICAL FIELD

The present invention relates to the technical field of environmental protection and the technical field of new energy development, and more particularly, to a dynamic two-way guide and drainage control method for leachate and landfill gas.

BACKGROUND

According to incomplete statistical data, the transportation amount of municipal domestic waste in China in 2014 was 178,600,000 tons; the domestic waste treated in a sanitary landfilling way which was effective to treat the municipal domestic waste was 107,440,000 tons, with 60% in total disposal ways. But the moisture content of mixed waste landfilled in China was as high as 40-60%, which was far greater than 20-30% in European and American countries. Moreover, domestic kitchen waste had a relatively high content of organic matters 60-65% in total domestic waste), and after being landfilled, the waste in itself was compressed and degraded to generate a large amount of leachate (landfill leachate) and landfill gas. However, the direct landfilling of the waste is easily inhibited by a highly concentrated organic acid; the methane-producing process is delayed; and under the conditions in which the diversion of rain and sewage water is improperly operated, the guiding-discharging designed capacity is low or a guiding-discharging facility is blocked, the landfilled waste is easily formed into a water barrier layer, such that the infiltration of the leachate is hindered and the leachate cannot be guided and discharged, even the water level of the leachate is raised, and thus the effective collection of the landfill gas is affected and there exists an environmental safety risk.

At present, due to a fact that most of waste landfills in China have low treatment technological level or improper management, there are problems such that a large amount of the landfill gas is released in an unorganized manner, the landfill gas is leaked and exploded the water level of the leachate is raised, the leachate is leaked and diffused, and the waste pile is in sedimentation deformation and out of stability. With the exploitation and utilization of the landfill gas, the internal pressure of the waste body may be reduced and the landfill gas therein is prevented from gathering to cause a fire, an explosion and other accidents. Therefore, in order to guarantee the safe operation of the waste landfill, there is a need to effectively control the landfill gas and the leachate therein.

Currently, it is a common practice for most waste landfills to compact the waste in a layered manner and cover it every day. In such a way, an operation side is sealed difficulty, such that the landfill gas is collected in an existing manner of drilling and erecting a vertical gas extraction well or a gas collecting pipe after the waste landfill is closed. Under the conditions in which an air seal is damaged or is submerged by the high-level leachate that is difficult to be discharged in time to form a water seal due to non-uniform waste settlement, it is easy to cause non-effective gas extraction or even paralysis. As a result, the landfill gas collection efficiency is extremely low. Furthermore, once excessive landfill gas is piled in the landfill, the pore pressure of the landfill is increased and therefore there exists a huge potential safety hazard to the landfill. Meanwhile, the leachate in the waste landfill is collected using an existing bottom leachate converging system, so under the conditions such as the pipe is deformed, blocked or corroded once the leachate cannot be guided and discharged out in time, the water level of the leachate is raised easily, and thus the landfill gas collection efficiency is reduced. Besides, there are more rains in south and has a turbulence phenomenon of a gas recycling pipe network commonly confronted by the waste landfill that the water level of the leachate is relatively high in essence, and after the rainwater is infiltrated from a surface of the landfilled waste, the water level of the leachate inside the waste is raised and the gas extraction well is blocked; and therefore, the discharging and the recycling rate of the landfill gas are directly affected.

Therefore, how to work out a gas-liquid controlled collection technology with high landfill gas collection efficiency, and smooth leachate guiding and discharging on the basis of existing landfill gas and leachate collection technologies and by combining with the characteristics of the landfills in China is of a great significance.

SUMMARY

The technical problem to be solved by the embodiments of the present invention is to provide a dynamic two-way guide and drainage control method for leachate and landfill gas, so as to improve the water-guiding permeability inside a waste body, and solve the problems that the water level of the leachate is raised, the landfill gas is escaped, the collection efficiency is extremely low and the like during a waste landfilling process at present.

To solve the above technical problem, the embodiments of the present invention provide a dynamic two-way guide and drainage control method for leachate and landfill gas. The dynamic two-way guide and drainage control method is used in a waste landfill; a plurality of main pipes are pre-buried on a bottom of the waste landfill; the waste landfill respectively communicates with a landfill gas bottom collection system and a leachate collection system through the plurality of the main pipes, wherein the landfill gas bottom collection system includes a vacuum pump positioned out of the waste landfill, and a gas discharging pipe penetrated into the bottom of the waste landfill and communicating the vacuum pump with the plurality of the main pipes; the leachate collection system includes a guiding-discharging pipe penetrated into the bottom of the waste landfill and communicating with the plurality of the main pipes; and the guiding-discharging pipe is positioned below the gas discharging pipe and is provided with a control valve thereon.

The method includes:

a. determining a current landfilling stage of the waste landfill, wherein the landfilling stage includes a landfilling initial stage, a landfilling middle stage and a landfilling later stage; and b. according to the determined current landfilling stage of the waste landfill, performing corresponding pretreatment on the waste body in the waste landfill and selecting the landfill gas bottom collection system and the leachate collection system to respectively enter a corresponding working state, wherein each of the working states is an open state or a closed state.

Herein, the step a concretely includes:

when the waste body piling height in the waste landfill is one-third smaller than a preset total landfilling height of the waste landfill, determining the current landfilling stage of the waste landfill as the landfilling initial stage;

when the waste body piling height in the waste landfill is one-third greater than the preset total landfilling height of the waste landfill but is smaller than the preset total landfilling height of the waste landfill, determining the current landfilling stage of the waste landfill as the landfilling middle stage; and when the waste body piling height in the waste landfill is up to the preset total landfilling height of the waste landfill, determining the current landfilling stage of the waste landfill as the landfilling later stage.

Herein, the step b concretely includes:

when determining that the current landfilling stage of the waste landfill is in the landfilling initial stage or in the landfilling middle stage, covering a temporary covering layer for preventing rainwater infiltration on a top of the waste body entered the waste landfill at each time;

according to a preset aeration frequency, performing aeration pretreatment on the waste body entered at each time through a plurality of temporary aeration wells preset on a surface of the corresponding temporary covering layer thereof, and during each aeration pretreatment, selecting the landfill gas bottom collection system to enter the open state and opening the vacuum pump to implement landfill gas collection; at the meantime, selecting the leachate collection system to enter the closed state and closing the control valve on the guiding-discharging pipe to stop the landfill gas (or outside air) from being discharged out (guided into) via the guiding-discharging pipe; and after the aeration pretreatment at each time is finished, selecting the leachate collection system to enter the open state and opening the control valve on the guiding-discharging pipe to implement leachate collection.

Herein, the temporary covering layer is implemented by means of paving a certain thickness of high-density polyethylene films, waterproof clothes or clay on a top of the waste body.

Herein, the thickness covered by the high-density polyethylene films and the waterproof clothes is between 0.1 mm to 0.6 cm.

Herein, the thickness covered by the clay is between 20 cm and 30 cm.

Herein, the step b further concretely includes:

when determining that the current landfilling stage of the waste landfill is in the landfilling later stage, covering a final covering layer for preventing the rainwater infiltration on a top and a lateral of the waste body of the waste landfill respectively, and drilling the final covering layer on the top of the waste body to erect a plurality of first gas extraction wells communicating with the vacuum pump; and selecting the landfill gas bottom collection system to enter the open state and opening the vacuum pump to implement the landfill gas collection; and meanwhile, selecting the leachate collection system to enter the open state and opening the control valve on the guiding-discharging pipe to implement the leachate collection; and until when the amount of the collected landfill gas is lower than a preset threshold, selecting the landfill gas bottom collection system to enter the closed state and closing the vacuum pump to stop the landfill gas collection.

Herein, the method further includes:

drilling at a middle position on the lateral of the waste body of the waste landfill to erect a plurality of second gas extraction wells or gas extraction channels communicating with the vacuum pump.

Herein, each of the final covering layers is implemented by means of paving a porous material gas discharging layer, a clay protective layer, the high-density polyethylene film and the clay on the top and the lateral of the waste body in sequence from the bottom up.

Herein, the leachate collection system further includes a water-collecting well communicating with the guiding-discharging pipe.

By implementing the embodiments of the present invention, the following beneficial effects are achieved.

According to the present invention, the gas discharging pipe and the guiding-discharging pipe that respectively communicate with h the main pipes and have different heights are arranged on the bottom of the waste landfill, so when the waste landfill is in different landfilling stages, by selecting the landfill gas bottom collection system and the leachate collection system to respectively enter the corresponding working state, it is implemented that the landfill gas enters the gas discharging pipe from the main pipes and is discharged, and the leachate enters the guiding-discharging pipe from the main pipes and is discharged under the action of a gravity and an inertia; and thus, the water-guiding permeability inside the waste body of the waste landfill is improved, and the problems that the water level of the leachate is raised, the landfill gas is escaped, the collection efficiency is extremely low and the like during the waste landfilling process t present are solved.

BRIEF DESCRIPTION OF THE DRAWINGS

For a more explicit description of the embodiments of the present invention or the technical solutions in the prior art, a brief introduction of accompanying drawings to be used in the description of these embodiments or the prior art will be given below. Obviously, the accompanying drawings described below are merely some embodiments of the present invention, and for those of ordinary skill in the art, other accompanying drawings derived from these ones without any creative efforts still fall into the scope of the present invention.

DETAILED DESCRIPTION

In order to make the purposes, the technical solutions and the advantages of the present invention more clear, the present invention will be further described below in detail with reference to the accompanying drawings.

Figure 1:
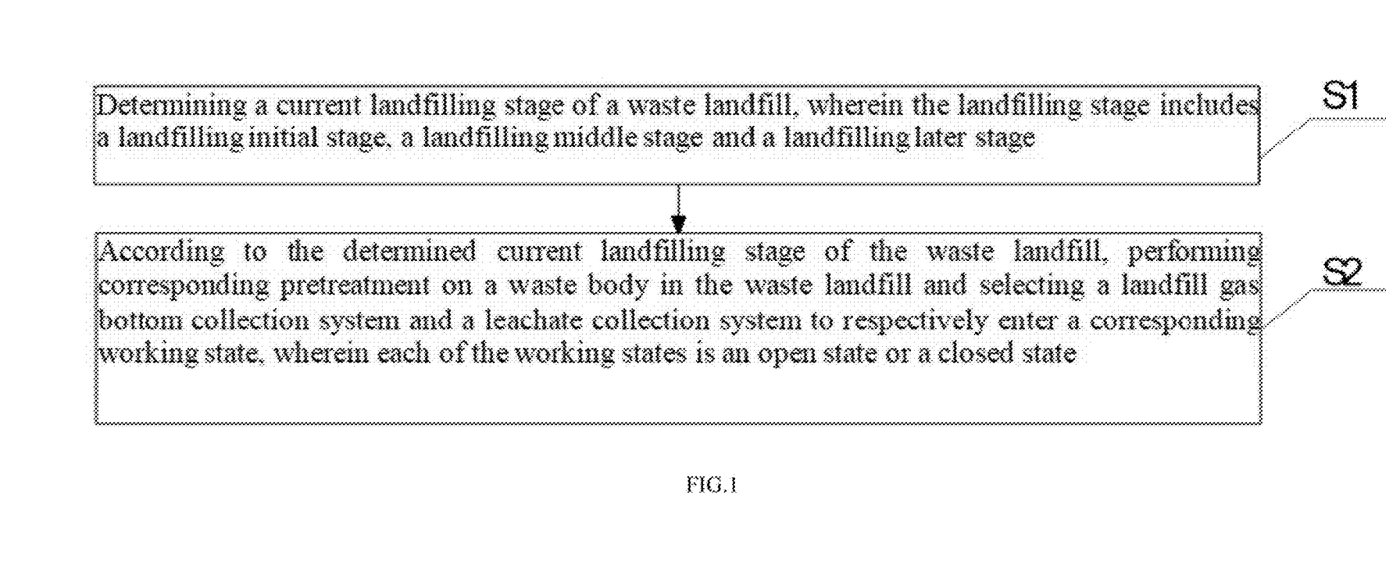
FIG. 1 is a flowchart of a dynamic two-way guide and drainage control method for leachate and landfill gas provided by an embodiment of the present invention.
Figure 2:
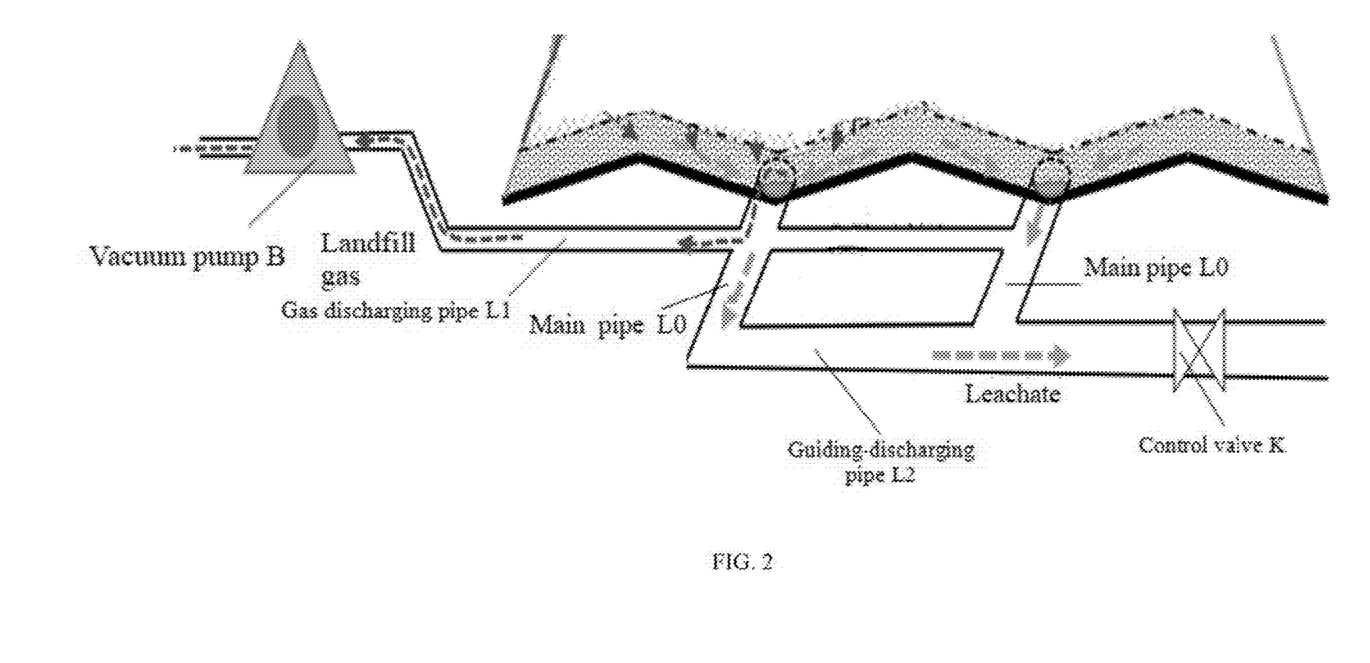
FIG. 2 is a diagram of an application scenario in which a waste landfill communicates with a landfill gas bottom collection system and a leachate collection system in a dynamic two-way guide and drainage control method for leachate and landfill gas provided by an embodiment of the present invention.

As shown in FIG. 1, in the embodiments of the present invention, there is provided a dynamic two-way guide and drainage control method for leachate and landfill gas. The dynamic two-way guide and drainage control method is used in a waste landfill; a plurality of main pipes L0 are pre-buried on a bottom of the waste landfill; the waste landfill respectively communicates with a landfill gas bottom collection system and a leachate collection system through the plurality of the main pipes L0, wherein the landfill gas bottom collection system includes a vacuum pump B positioned out of the waste landfill, and a gas discharging pipe L1 penetrated into the bottom of the waste landfill and communicating the vacuum pump B with the plurality of the main pipes L0; the leachate collection system includes a guiding-discharging pipe L2 penetrated into the bottom of the waste landfill and communicating with the plurality of the main pipes L0; and the guiding-discharging pipe L2 is positioned below the gas discharging pipe L1 and is provided with a control valve K thereon (as shown in FIG. 2). Of course, in order to gather the collected leachate, the leachate collection system further may include a water-collecting well communicating with the guiding-discharging pipe L2.

The method includes the following steps.

Step S1, determining a current landfilling stage of the waste landfill, wherein the landfilling stage includes a landfilling initial stage, a landfilling middle stage and a landfilling later stage.

The specific process is as follows: when the waste body piling height in the waste landfill is one-third smaller than a preset total landfilling height of the waste landfill, determining the current landfilling stage of the waste landfill as the landfilling initial stage;

when the waste body piling height in the waste landfill is one-third greater than the preset total landfilling height of the waste landfill but is smaller than the preset total landfilling height of the waste landfill, determining the current landfilling stage of the waste landfill as the landfilling middle stage; and when the waste body piling height in the waste landfill is up to the preset total landfilling height of the waste landfill, determining the current landfilling stage of the waste landfill as the landfilling later stage.

Step S2, according to the determined current landfilling stage of the waste landfill, performing corresponding pretreatment on a waste body in the waste landfill and selecting the landfill gas bottom top collection system and the leachate collection system to respectively enter a corresponding working state, wherein each of the working states is an open state or a closed state.

The specific process is as follows: the w hole waste landfilling process is divided into three stages, namely the landfilling initial stage, the landfilling middle stage and the landfilling later stage. As a result, corresponding different operating methods are provided for each stage to treat the waste body and are specifically described hereinafter.

Figure 3:
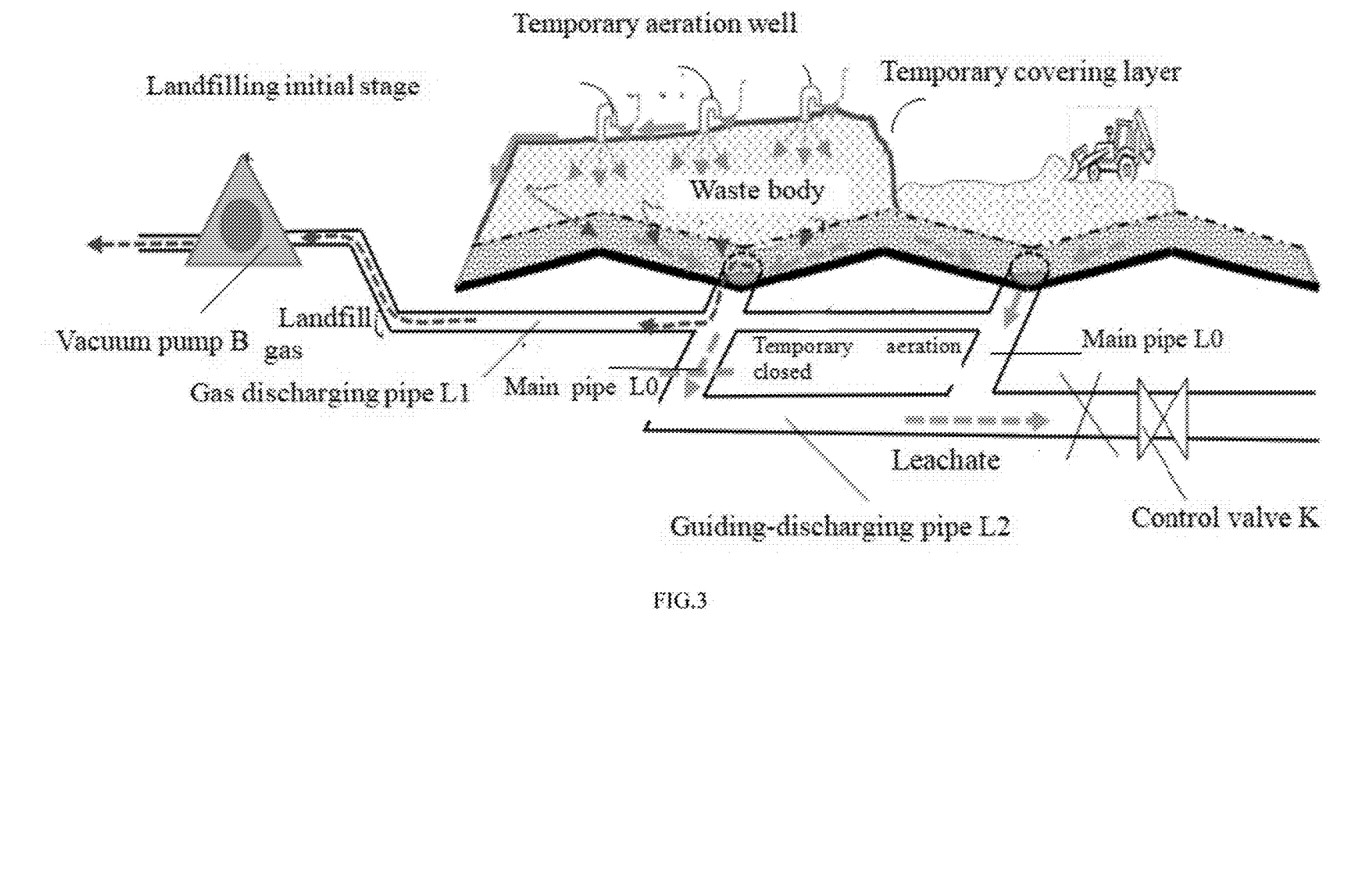
FIG. 3 is a diagram of an operation application scenario at a landfilling initial stage of a waste landfill in a dynamic two-way guide and drainage control method for leachate and landfill gas provided by an embodiment of the present invention.

(1) The landfilling initial stage (as shown in FIG. 3): when the current landfilling stage of the waste landfill is in the landfilling initial stage, covering a temporary covering layer for preventing rainwater infiltration on a top of the waste body entered the waste landfill at each time;

according to a preset aeration frequency, performing aeration pretreatment on the waste body entered at each time through a plurality of temporary aeration wells preset on a surface of the corresponding temporary covering layer thereof, and during each aeration pretreatment, selecting the landfill gas bottom collection system to enter the open state and opening the vacuum pump B to implement landfill gas collection; at the meantime, selecting the leachate collection system to enter the closed state and closing the control valve K on the guiding-discharging pipe L2 to stop the landfill gas from being discharged out via the guiding-discharging pipe L2 or the outside air from being guided into via the guiding-discharging pipe L2; and thus, the reduction in the gas extraction effect of the waste body is effectively avoided; and after the aeration pretreatment at each time is finished, selecting the leachate collection system to enter the open state and opening the control valve K on the guiding-discharging pipe L2 to implement leachate collection.

In the landfilling initial stage (1), first of all, when the waste body enters the waste landfill at each time, the temporary covering layer thereon may effectively prevent the rainwater from infiltrating via a surface of the landfilled waste and thus the water level of the leachate inside the waste body is prevented from rising.

Next, the aeration pretreatment on the top is to accelerate the consumption of a volatile fatty acid generated in a waste degradation process and reduce the moisture content in the waste. By virtue of the aeration, the easily biodegradable organics in the waste can be decomposed quickly and aerobically to form an acidic product in pore water and the inhibition on methanogens to produce methane in a later period is reduced; therefore, with the removal of an acidic material, the methane-producing lag period is greatly shortened. Moreover, with the aeration, the pH value of the waste is increased, the chemical oxygen demand and the biochemical oxygen demand in the leachate are reduced, and the water quality of the leachate is improved.

Then, in an early stage, the landfill gas bottom collection system performs bottom vacuum discharging on the waste body entered the waste landfill at each time, and a pressure gradient is formed in the waste body. As a result, not only is the removal effect of the leachate in the later period greatly improved, but also the collection efficiency of the landfill gas can be improved, the bad smell on the top is controlled to escape, the pollution hazard to the environment is reduced, and the problem of rising water level of the leachate is overcome. Furthermore, because the depth-burying gradients of the gas discharging pipeline L1 and the guiding-discharging pipeline L2 are different, gas-liquid separation is automatically implemented between the landfill gas and the leachate obtained in the bottom vacuum discharging. Herein, the landfill gas is collected by the gas discharging pipeline L1, and the leachate and other condensed water are collected by the guiding-discharging pipe L2.

At last, with the effective removal of the leachate, an aerated void space in the waste body can be increased and owing to increased voids, a contact area of microbes can be reduced, which is of great importance to alleviate acid inhibition generated by an organic waste hydrolyzed fermentation product in the landfilling initial stage (1). Additionally, due to a gravity action and a self load during the later period (such as a methane-producing stage) or in the process that the waste is continuously piled on the temporary covering surface, the porosity of the waste on the bottom is gradually reduced, and the contact area of a substrate is gradually increased.

Figure 4:
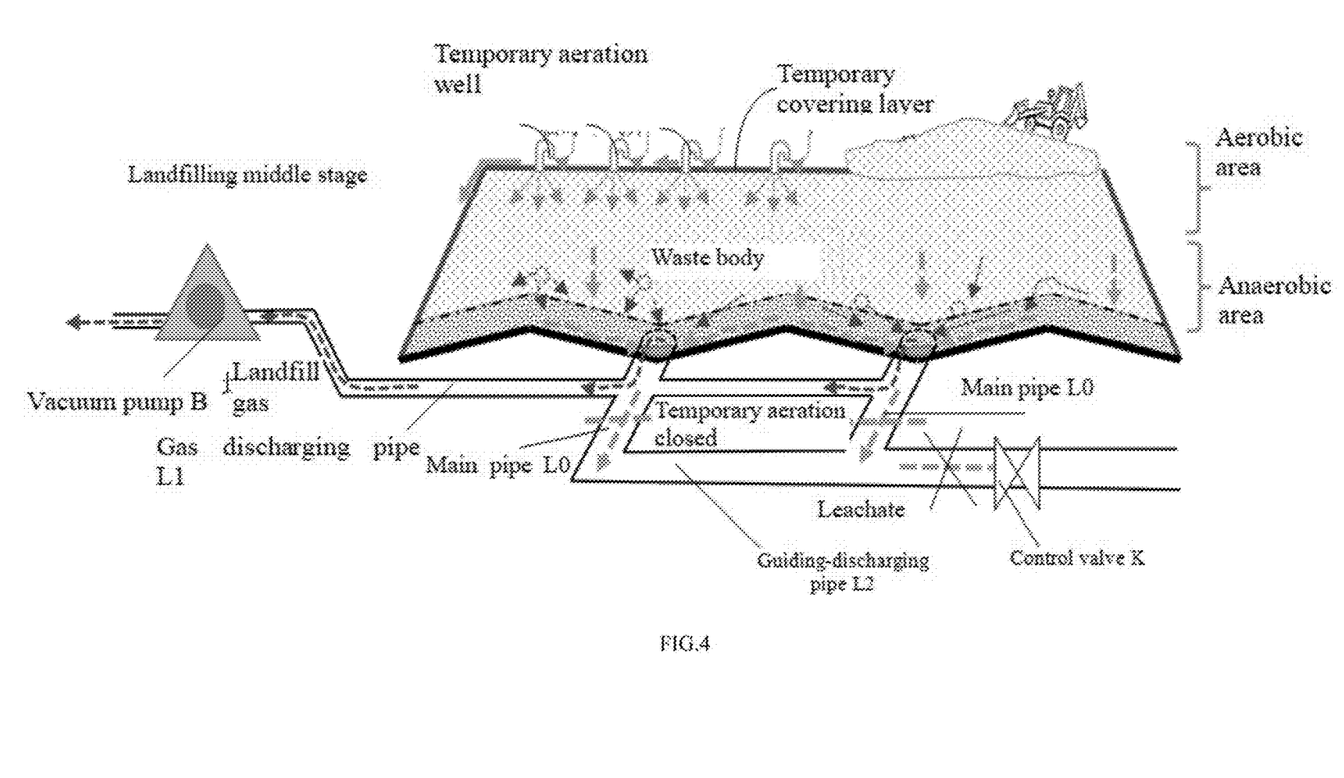
FIG. 4 is a diagram of an operation application scenario at a landfilling middle stage of a waste landfill in a dynamic two-way guide and drainage control method for leachate and landfill gas provided by an embodiment of the present invention.

(2) The landfilling middle stage (as shown in FIG. 4): when the current landfilling: stage of the waste landfill is in the landfilling middle stage, covering the temporary covering layer for preventing the rainwater infiltration on the top of the waste body entered the waste landfill at each time;

according to the preset aeration frequency, performing the aeration pretreatment on the waste body entered at each time through the plurality of the temporary aeration wells preset on the surface of the corresponding temporary covering layer thereof, and during each aeration pretreatment, selecting the landfill gas bottom collection system to enter the open state and opening the vacuum pump B to implement the landfill gas collection; at the meantime, selecting the leachate collection system to enter the closed state and closing the control valve K on the guiding-discharging pipe L2 to stop the landfill gas from being discharged out via the guiding-discharging pipe L2 or the outside air from being guided into via the guiding-discharging pipe L2; and thus, the reduction in the gas extraction effect of the waste body is effectively avoided; and after the aeration pretreatment at each time is finished, selecting the leachate collection system to enter the open state and opening the control valve K on the guiding-discharging pipe L2 to implement the leachate collection.

In the landfilling middle stage (2), the corresponding operating methods are the same as those in the landfilling initial stage (1); that is, the temporary aeration pretreatment on the top is continuously kept, and simultaneously the landfill gas bottom collection system is selected to enter the open state; through opening the vacuum pump B, the operation of collecting the bottom negative pressure landfill gas is implemented. The specific beneficial effects are referred to related contents in the land filling initial stage (1) and will not be repeated one by one here.

While the piling height of the waste body is increased, the waste body is decomposed in nature into a top aerobic layer, a middle anoxic transition layer and a bottom anaerobic gas-producing layer. At this time, the aeration pretreatment is still performed on the to p temporary covering layer, and it cannot reach to middle and lower portions due to the degree of oxygen pickup. The aerobic decomposition is merely limited to a top aeration layer. However, for a deep-burial middle layer, the aeration pretreatment is only performed at the early stage and now the layer is gradually becoming an anoxic layer.

Figure 5:
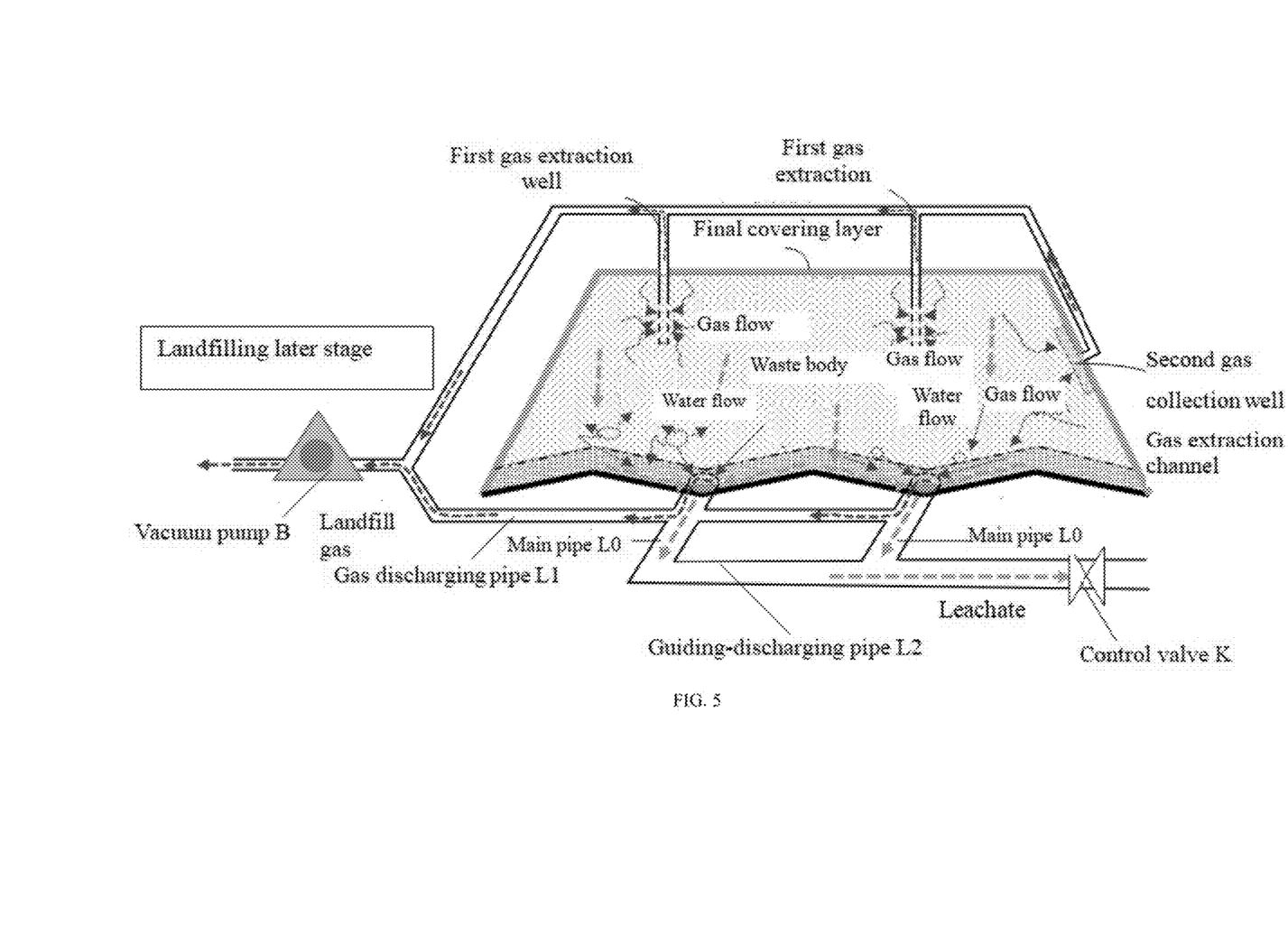
FIG. 5 is a diagram of an operation application scenario at a landfilling later stage of a waste landfill in a dynamic two-way guide and drainage control method for leachate and landfill gas provided by an embodiment of the present invention.

(3) The landfilling later stage (as shown in FIG. 5): when the current landfilling stage of the waste landfill is in the landfilling later stage, covering a final covering layer for preventing the rainwater infiltration on a top and a lateral of the waste body of the waste landfill respectively, and drilling the final covering layer on the top of the waste body to erect a plurality of first gas extraction wells communicating with the vacuum pump; and selecting the landfill gas bottom collection system to enter the open state and opening the vacuum pump B to implement the landfill gas collection; and meanwhile, selecting the leachate collection system to enter the open state and opening the control valve K on the guiding-discharging pipe L2 to implement the leachate collection; and until when the amount of the collected landfill gas is lower than a preset threshold, selecting the landfill gas bottom collection system to enter the closed state and closing the vacuum pump B to stop the landfill gas collection.

In the landfilling later stage (3), a reservoir is full, and the thickness of the landfilled waste reaches to a designed maximum height (i.e., the preset total landfilling height of the waste landfill). After the final covering layers to be covered are finished, the gas extraction wells are installed, thereby implementing that the landfill gas is extracted out simultaneously from the top and the bottom via the vacuum pump B. Of course, in order to further improve the landfill gas collection efficiency, it is necessary to drill at a middle position on the lateral of the waste body of the waste landfill to erect a plurality of second gas extraction wells or gas extraction channels communicating with the vacuum pump B.

It is to be noted that, in the landfilling later stage (3), the working states that the landfill gas bottom collection system and the leachate collection system are selected to enter may be dynamically controlled as per an actual demand. For example, when the amount of the collected landfill gas is lower than a preset threshold, that is, the landfill gas is nearly stopped, the landfill gas bottom collection system enters to the closed state and the vacuum pump B is closed to stop the landfill gas collection. When the atmospheric pressure of the landfill gas is excessively high or the amount of the leachate is excessively large, both the landfill gas bottom collection system and the leachate collection system enter the open state, the vacuum pump B is opened to implement the landfill gas collection, and the control valve K on the guiding-discharging pipe L1 is opened to implement the leachate collection. At this moment, with the vacuum extraction, there is a gas-liquid pressure gradient in the waste body to form a gas-liquid flowing path, such that the leachate and the landfill gas can be more effectively removed.

It may be understood that, owing to the landfill gas bottom collection system, the gas extraction wells drilled on the top of the waste body are not necessary as deep as those in the conventional landfill (generally about 70-80% of the buried depth); or rather, they are shallower than the conventional gas extraction wells. In this way, not only is the landfill gas collection efficiency improved, but also the installation difficulty is greatly reduced, the construction is convenient, the engineering cost is low and the later maintenance and management are convenient.

In the embodiments of the present invention, the temporary covering layers in the landfilling initial stage (1) and the landfilling middle stage (2) are implemented by means of paving a certain thickness of high-density polyethylene films, waterproof clothes or clay on the top of the waste body. Herein, the thickness covered by the high-density polyethylene films and the waterproof clothes is between 0.1 mm to 0.6 cm. The thickness covered by the clay is between 20 cm and 30 cm. The preset aeration frequency may be referred to 1-2 h/time and 2-4 times/day.

In the landfilling later stage (3), each of the final covering layers is implemented by means of paving a porous material gas discharging layer, a clay protective layer, the high-density polyethylene film and the clay on the top and the lateral of the waste body in sequence from the bottom up. Moreover, a plant may be grown on the final covering layers respectively.

By implementing the embodiments of the present invention, the following beneficial effects are achieved.

According to the present invention, the gas discharging pipe and the guiding-discharging pipe that respectively communicate with the main pipes and have different heights are arranged on the bottom of the waste landfill, so when the waste landfill is in different landfilling stages, by selecting the landfill gas bottom collection system and the leachate collection system to respectively enter the corresponding working state, it is implemented that the landfill gas enters the gas discharging pipe from the main pipes and is discharged, and the leachate enters the guiding-discharging pipe from the main pipes and is discharged under the action of a gravity and an inertia; meanwhile, the landfill gas in the landfilling later stage may be simultaneously extracted out from the bottom and the top; and thus, the water-guiding permeability inside the waste body of the waste landfill is improved, and the problems that the water level of the leachate is raised, the landfill gas is escaped, the collection efficiency is extremely low and the like during the waste landfilling process at present are solved.

Those of ordinary skill in the art may understand that all of or a part of the steps to implement the above-described method in the embodiments can be accomplished by program instructing relevant hardware. The program may be stored in a computer readable storage medium and the storage medium may be a read-only memory (ROM)/random-access memory (RAM), a magnetic disk, an optical disk and the like.

The above described embodiments are merely preferred embodiments of the present invention, and of course, are not intended to limit the present invention. Any equivalent alternations that are made according to the claims of the present invention should be included in the scope of the present invention.

We claim:

1. A dynamic two-way guide and drainage control method for leachate and landfill gas used in a waste landfill, wherein a landfill gas bottom collection system and a leachate collection system fluidly connected with a plurality of main pipes are pre-buried on a bottom of the waste landfill, wherein the landfill gas bottom collection system comprises a vacuum pump positioned out of the waste landfill, and a gas discharging pipe penetrated into the bottom of the waste landfill and communicating the vacuum pump with the plurality of the main pipes; the leachate collection system comprises a guiding-discharging pipe penetrated into the bottom of the waste landfill and communicating with the plurality of the main pipes; and the guiding-discharging pipe is positioned below the gas discharging pipe and is provided with a control valve thereon;

wherein the method comprises:
  a. determining a current landfilling stage of the waste landfill, wherein the landfilling stage comprises a landfilling initial stage, a landfilling middle stage or a landfilling later stage, and wherein:
  when the waste body piling height in the waste landfill is one-third smaller than a preset total landfilling height of the waste landfill, the current landfilling stage of the waste landfill is the landfilling initial stage;
  when the waste body piling height in the waste landfill is one-third greater than the preset total landfilling height of the waste landfill but is smaller than the preset total landfilling height of the waste landfill, the current landfilling stage of the waste landfill is the landfilling middle stage; and
  when the waste body piling height in the waste landfill is up to the preset total landfilling height of the waste landfill, the current landfilling stage of the waste landfill is the landfilling later stage; and
  b. when the current landfilling stage of the waste landfill is in the landfilling initial stage or in the landfilling middle stage, covering a temporary covering layer for preventing rainwater infiltration on a top of the waste body entered the waste landfill at each time; according to a preset aeration frequency, performing aeration pretreatment on the waste body entered at each time through a plurality of temporary aeration wells preset on a surface of the corresponding temporary covering layer thereof, and during each aeration pretreatment, selecting the landfill gas bottom collection system to enter the open state and opening the vacuum pump to implement landfill gas collection; at the meantime, closing the control valve on the guiding-discharging pipe to stop the landfill gas (or outside air) from being discharged out (guided into) via the guiding-discharging pipe; and after the aeration pretreatment at each time is finished, opening the control valve on the guiding-discharging pipe to implement leachate collection;
  or when the current landfilling stage of the waste landfill is in the landfilling later stage, covering a final covering layer for preventing the rainwater infiltration on a top and a lateral of the waste body of the waste landfill respectively, and drilling the final covering layer on the top of the waste body to erect a plurality of first gas extraction wells communicating with the vacuum pump; opening the vacuum pump to implement the landfill gas collection; and meanwhile, selecting the leachate collection system to enter the open state and opening the control valve on the guiding-discharging pipe to implement the leachate collection, and until when the amount of the collected landfill gas is lower than a preset threshold, closing the vacuum pump to stop the landfill gas collection.

2. The method as claimed in claim 1, wherein the temporary covering layer is implemented by means of paving a certain thickness of high-density polyethylene films, waterproof liner or clay on a top of the waste body.

3. The method as claimed in claim 2, wherein the thickness covered by the high-density polyethylene films and the waterproof clothes is between 0.1 mm to 0.6 cm.

4. The method as claimed in claim 2, wherein the thickness covered by the clay is between 20 cm and 30 cm.

5. The method as claimed in claim 2, wherein the method further comprises:
  drilling at a middle position on the lateral of the waste body of the waste landfill to erect a plurality of second gas extraction wells or gas extraction channels communicating with the vacuum pump.

6. The method as claimed in claim 5, wherein each of the final covering layers is implemented by means of paving a porous material gas discharging, layer, a clay protective layer, the high-density polyethylene film and the clay on the top and the lateral of the waste body in sequence from the bottom up.

7. The method as claimed in claim 1, wherein the leachate collection system further comprises a water-collecting well communicating with the guiding-discharging pipe.

* * * * *